(No Model.)

V. W. BLANCHARD.
LOW WATER ALARM.

No. 413,899. Patented Oct. 29, 1889.

WITNESSES
Phil C. Dieterich
A. E. Sowell

INVENTOR
Virgil W. Blanchard
By his Attorney
J. A. Alexander

UNITED STATES PATENT OFFICE.

VIRGIL W. BLANCHARD, OF NEW YORK, N. Y., ASSIGNOR TO JOSEPH A. DAVIS, OF SAME PLACE.

LOW-WATER ALARM.

SPECIFICATION forming part of Letters Patent No. 413,899, dated October 29, 1889.

Application filed April 4, 1889. Serial No. 305,969. (No model.)

*To all whom it may concern:*

Be it known that I, VIRGIL W. BLANCHARD, of New York, in the county of New York and State of New York, have invented certain new and useful Improvements in Low-Water Alarms; and I do hereby declare that the following is a full, clear, and exact description thereof, reference being had to the accompanying drawings, and to the letters of reference marked thereon, which form part of this specification, in which—

Figure 1:
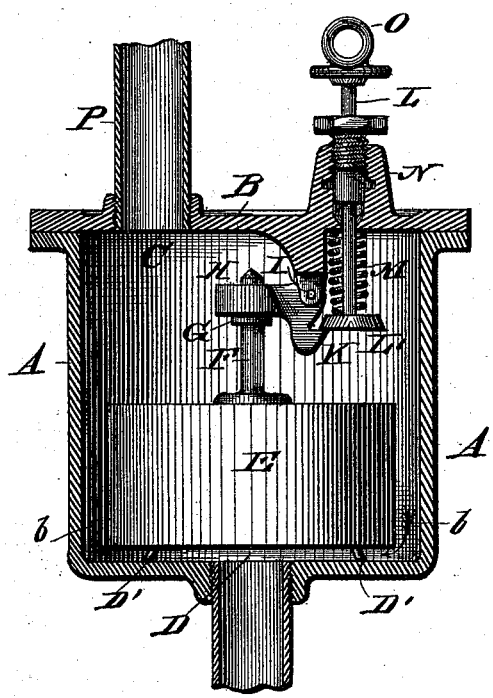
Figure 2:
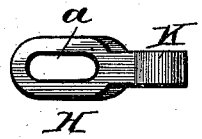

Figure 1 is a diametrical section through my improved automatic water-alarm. Fig. 2 is a top view of the slotted dog.

This invention relates to means for giving notice to the engineer should the force-pump which supplies a steam-boiler with water fail to perform its duty effectually or efficiently; and it consists in a novel low-water-alarm device, which is constructed and operated as hereinafter clearly described and claimed.

Referring by letters to the drawings, A designates a cylindrical vessel of suitable size and strength, which is closed on top by a tight cover B.

C indicates an opening through the cover B for the inlet water-pipe P, and D is an opening through the bottom of the vessel A for the exit water-pipe.

E designates a hollow metallic float having a stem F rigidly secured to and rising from the upper side and center of this float, said stem being provided near its upper extremity with a collar G, upon which bears the tail of a dog H. This dog is pivoted at I to ears extending downward from and forming rigid parts of the cover B, and the dog is provided with an oblong slot *a* through its tail, through which the stem F passes freely. The dog is also constructed with a beveled catch or nose K.

L designates a rod or stem passing through a stuffing-box N, formed on cover B, said rod or stem being provided at its lower extremity with a disk L', having a beveled periphery adapted to be engaged with the beveled nose K of the dog H, as indicated in the drawings.

O designates a ring on the upper extremity of the rod L, by which the latter can be connected to a steam-whistle or other suitable alarm. Surrounding the rod L, between the cover B and the disk L', is a coiled spring M, which forcibly actuates the rod L in a downward direction when this rod is released from the dog, thereby causing an alarm to be sounded. If the rod be weighted, the spring might be dispensed with.

D' designates studs rising from the bottom of the vessel A and supporting the float E when down, so as to leave an uninterrupted passage through said vessel, as indicated by the arrows *b* on Fig. 1.

In practice the device above described, fixed securely in a vertical position, is connected with a force-pump which supplies a steam-boiler, or in the water-circuit of the boiler in proper position, the water flowing through the vessel A downward on its way to the pump. The rod L is then drawn up by hand, thus compressing the spring and engaging disk L' with the dog H. As the water supplied to the boiler passes through vessel A, any failure on the part of the force-pump to deliver it as fast as it is supplied (the action of the force-pump should be a little faster than is necessary to deliver only the requisite volume of water into the boiler in a given time) will cause an accumulation of water in the vessel A, which will lift the float E, and by means of the collar G actuate the dog H on its pivot I sufficiently to cause catch K to disengage disk L', when the rod will be depressed and thus sound an alarm if properly connected. By this means any failure on the part of the force-pump to supply the proper amount of water to the boiler will be automatically and with certainty communicated to the engineer in an emphatic manner. The alarm can also be used as a high-water indicator and in various other positions obvious to those skilled in the art.

Having thus described my invention, what I claim is—

1. The within-described automatic water-alarm, consisting of a vessel having inlet and outlet passages, a hollow float having a collared stem, a pivoted latching-dog above said float engaging said stem, and a rod playing through a stuffing-box above the float and provided with a disk on its lower end engaging said dog, and means for connecting the rod with an alarm, all substantially as specified.

2. The within-described automatic water-alarm, consisting of a vessel A, having inlet and outlet passages, a hollow float having a vertical stem provided with a collar, a latching-dog pivoted above the float, and a spring-actuated rod playing through a stuffing-box and provided with a disk on its lower end, and means for connecting the rod with an alarm, all constructed and adapted to operate substantially in the manner set forth.

3. The combination of the vessel A, the float E therein, having a stem F, and the dog H, engaging said stem and having a catch K, and pivoted to lugs depending from the top of said vessel, with the vertically-movable rod L, engaging said catch and passing through the top of said vessel, and means for connecting the rod with an alarm, all substantially as set forth.

4. The combination of the vessel A, having inlet and outlet passages and studs D', and the rod L, having disk L' and spring M, and means for connecting the rod with an alarm, with the pivoted dog K, the float E, and its collared stem F, all substantially as and for the purpose specified.

In testimony that I claim the foregoing as my own I affix my signature in presence of two witnesses.

VIRGIL W. BLANCHARD.

Witnesses:
W. P. KEYWORTH,
F. O. McCLEARY.